April 8, 1958     L. H. MORIN     2,829,402
CAST LINK CHAIN AND METHOD OF PRODUCING THE SAME
Filed June 18, 1952
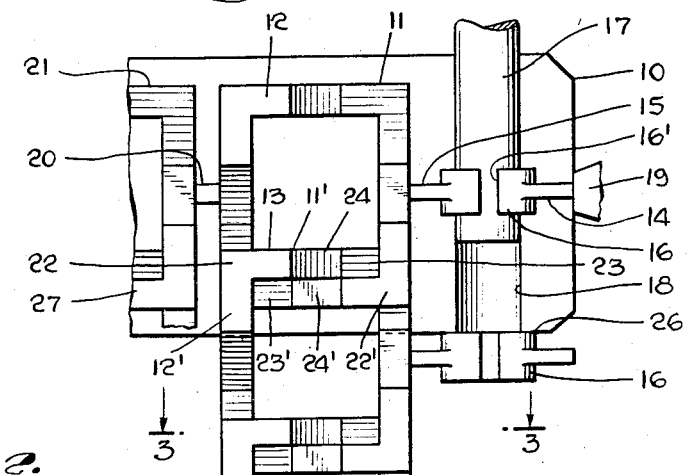
INVENTOR
LOUIS H. MORIN
BY
ATTORNEY

United States Patent Office 2,829,402
Patented Apr. 8, 1958

2,829,402

CAST LINK CHAIN AND METHOD OF PRODUCING THE SAME

Louis H. Morin, Bronx, N. Y.

Application June 18, 1952, Serial No. 294,185

12 Claims. (Cl. 18—55)

This invention relates to the production of chain or interlinked members, wherein one link is cast within the other link, or loop, in forming an assemblage. More particularly, the invention deals with a method of producing chain, wherein one previously formed link of the chain is utilized in forming part of the cavity in forming the next successive link, thereby producing chain without the use of core members between adjacent surfaces of the links.

The novel features of the invention will be best understood from the following description, when taken together with the accompanying drawing, in which certain embodiments of the invention are disclosed and, in which, the separate parts are designated by suitable reference characters in each of the views and, in which:

Fig. 1 is a diagrammatic view showing a surface of a die employed in forming an endless chain or groups of chains, the die being broken away.

Fig. 2 is a perspective view of one of the links of a chain detached.

Fig. 3 is a section on the line 3—3 of Fig. 1.

Fig. 4 is a view, similar to Fig. 1, showing another adaptation of my invention; and Fig. 5 is an enlarged section on the line 5—5 of Fig. 4 omitting the gate portion.

In Fig. 1 of the drawing, I have indicated at 10 a face view of one die of a pair of dies employed for producing an endless link chain, or a pair of chains, the die having a cavity 11 for forming a link 12, the cavity 11 also having a cavity portion 11' receiving the upper portion 13 of a precast link 12' formed in the cavity 11.

At 14 I have indicated a gate or sprue passage which opens into the cavity 11 through the gate part 15, the gate including a split ring portion 16 which is formed about a transfer pin 17 movable vertically in a bore 18 of the die by any suitable means. At 19 I have indicated part of the injection nozzle for injecting suitable casting or molding material into the cavity 11.

Another supplemental gate or sprue portion 20 may be employed to open into another cavity 21, similar to the cavity 11 in all respects, so that a pair of links can be formed simultaneously in each injection charge of the casting or molding material into the die. It will be apparent that the split portion 16' of the ring is formed by a suitable contour in the associate die, which is not shown. The split ring 16 is employed to free the transfer pin 17 in the stripping operation, later described.

In Fig. 2 of the drawing, I have shown, in perspective, a complete link detached from the chain and, in Fig. 3, I have shown a section through coupled links of the chain.

From Fig. 2, it will be apparent that each link has two pairs of diagonally opposed corner portions 22, 22' and 23, 23', the corner portions 22, 22' being in one plane; whereas, the portions 23, 23' are in an offset plane. The adjacent portions 22, 23 are joined by an offset intermediate part 24; whereas, the adjacent portions 22', 23' are joined by another intermediate part 24' which is arranged in crossed relationship with respect to the part 24 as will clearly appear from a consideration of Fig. 3 of the drawing. In like manner, the adjacent corner portions 22, 23' are offset with respect to each other and joined by an angular part 25 and the adjacent portions 23, 22' are joined by a part 25', the latter being in crossed relationship with respect to the part 25.

Considering that the link 12 is shown in Fig. 2 of the drawing, it will be apparent that the opposed corners 23, 23' are formed in the impression 11 of the die 10 shown in Fig. 1; whereas, the corners 22, 22' will be formed in the companion die.

After a link has been formed in the cavity 11, the dies are opened and the pin 17 is moved downwardly to bring the collar or ring portion 16 in alinement with the lower surface 26 of the die, after which the dies are partially closed and the pin 17 is then returned to the position shown in full lines in Fig. 1; whereupon, the dies are closed, preparatory to forming the next successive shot or injection of casting or molding material. It will be understood that the first link referred to now assumes the position of the link 12' and the upper corners 22 and 23 and the joining portion 24 are disposed in the cavity part 11' of the die 10 and its companion die, thus in forming the next successive link, part of the corner portion 23' is formed rearwardly of the corner 22 and the corner portion 22' is formed forwardly of the corner 23; whereas, the joining part 24' is formed beneath the joining part 24.

The foregoing operation continues in forming successive castings and the gates or sprues of the links are trimmed off, thus leaving a resulting endless chain, comprising the series of links formed one within the other. It will be understood that, if the double cavity is employed, as partly indicated in Fig. 1, another complete chain of links, similar to the chain shown at the right of Fig. 1 will be formed and one link of this chain is indicated in part at 27 in Fig. 1.

In Figs. 4 and 5 of the drawing, I have shown another adaptation of my invention, wherein a die 28 is employed having large and small cavities 29 and 30, to which extend branches 31 and 32 of a gate or sprue, the latter also including a split ring 33, similar to the ring 16, the ring 33 being formed around a transfer pin 34 similar to the pin 17.

The die 28 also includes a supplemental cavity 29' for receiving the casting 35 formed in the cavity 29. The casting may be in the form of a medalion, including a small ring or eye 36 at one end thereof, the positioning of the casting in the cavity 29' is designated by the reference character 35'. The die 28 also has a cavity 37 for forming a ring or link 38 cast within the ring 36. In other words, in forming the ring 36, this ring is formed with an offset portion 39, note Fig. 5, similar to the offsets 24, 24' and, in casting the ring 38, this ring has an offset, as indicated at 40 which crosses the offset 39. In Figs. 4 and 5, one entire side portion of the ring is offset with respect to the opposed side portion.

In forming the united parts 35, 38 of Fig. 4, it will be understood that, when the casting or medalion is disposed in the cavity 29', as indicated at 35', the next shot or injection charge will automatically form the casting 35 and the ring 38. This operation continues in the successive feeding of the castings by the pin 34, after which the gates are trimmed off from the parts 35, 38, leaving these parts united, as will be apparent. The die 28 has a surface 41, similar to the surface 26 for stripping the pin 34 from the casting or the ring 33 thereon. It will also be understood that a gate portion 31' is employed for receiving the gate or sprue of a previous casting when positioned as at 35'.

With both methods of procedure disclosed, it will be apparent that no cores are required in forming the assembled parts or links and, in both instances, surfaces of one previously formed casting is utilized in forming part of the impression or cavity for producing the associated or united part.

The fact that with these methods loosely interconnected links or parts can be formed without using cores is an improvement over the methods disclosed in my prior Patents Nos. 2,363,801 and 2,424,047, in the first of which each link is cast about or within a non-disposable core, and in the second of which each link is cast using a disposable core such as one made of paper. The present invention eliminates the necessity for cores, and concurrently therewith eliminates the problem of core wear of non-disposable cores and the problem of removing paper cores which tend to stick to the casting. Core wear has heretofore been a substantial factor of expense, both in "downtime" and in the labor and cost of replacing worn cores, particularly fragile cores that are used for making small castings. With the elimination of cores another troublesome difficulty is avoided, namely, the occurrence of flash associated with cores, the removal of which, particularly on small articles, has constituted an important expense item. The invention thus renders it commercially attractive to produce small castings.

As noted, a casting may be formed against and in contact with a previously formed casting, as shown in Figs. 1 and 4, where the subsequently formed casting is formed in contact with a plurality of spaced surfaces of the previous interlinked casting. Two of such spaced surfaces are side surfaces, note the portions 22a and 23a of Figs. 2 and 3. These interlinked castings may later be separated without difficulty to form loosely interconnected links. Thus, upon subjecting any pair of the above-described interlinked castings to a slight stress or strain, each casting of such pair becomes movable relatively to the other. The stress or strain may be applied manually by holding one casting and moving the other.

As may be apparent, each cast or molded product has offset portions having surfaces which may be defined as inner and outer surfaces that are in alinement or in a common plane. Thus, in Fig. 2, surfaces 22a and 23a of the horizontally offset portions 22 and 23, respectively, are in the same plane, and this plane may be regarded as passing through the link 12 at the broken lines 24a, 25'a, 24'a, and 25a. The surface 22a is the inner one and the surface 23a is the outer one, these two surfaces being opposed to each other. Similarly, in Fig. 2, there are alined surfaces 22'a and 23'a of the horizontally offset portions 22' and 23', respectively; alined surfaces 22a and 23'a of the vertically offset portions 22 and 23', respectively; and alined surfaces 23a and 22'a of the vertically offset portions 23 and 22'.

In this connection the broken lines in Fig. 2 designated 24a, 25'a, 24'a, and 25a indicate the parting line of the dies of Fig. 1. In Fig. 5, the broken line 36a indicates the parting line of the dies in Fig. 4. From this it will be seen how a part of each casting is formed in each die.

The invention is not confined to producing the rectangularly shaped link of Fig. 2. Square-shaped links, and also links of circular, elliptical, oval, etc., shape may be formed, including links of the shape disclosed in my said prior patents. Broadly, the links may be seen to comprise four parts through each of which a common plane passes. The first part, which in Fig. 2 is designated 24, is offset to one side of the plane; that is to say, considering the plane to pass through the broken line 24a, and considering the part 24 as extending from corner 22 to corner 23, it will be seen that part 24 extends from a position outwardly of such plane (on the side near the reader) to a position inwardly of the plane (on the side away from the reader). Part 24 may thus be said to be offset to the latter side. At corner 23, the part 24 merges into a second part 25', which part is offset to the opposite side of the said plane, or to the side toward the reader. The second part merges into a third part 24' which is offset to the said one side of the plane, and the third part 24' merges into a fourth part 25 which is offset to the said opposite side of the plane. The fourth part merges into the first part 24.

As viewed in Fig. 2, the link shown there may be described as having upper and lower parts 24 and 24', respectively, which are connected together by arms 25 and 25'. In Fig. 5, the part 39 of ring 36 is connected to the medallion 35 by a pair of arms which, although having no reference numerals, are clearly shown in Fig. 4 as upper and lower arms with the tie line of numeral 36 being directed to the upper arm.

Two or more sets of chains may be formed simultaneously, each corresponding link of each set being initially joined by a gate such as the gate 20 in Fig. 1.

In summary, the methods illustrated in Figs. 1 and 4 for casting relatively movable interlinked members may be seen to comprise the following steps: A first member is formed in one casting operation by pressure injecting casting material into a pair of relatively movable dies. This member has a pair of oppositely disposed parts which are offset with respect to a plane passing through the parting line of the dies, and one of such parts is offset oppositely to the other. Then the dies are separated to free the member, and the latter is moved relatively to the dies. The dies are closed about at least a portion of the member, and a succeeding member is formed interlinked with the first member by pressure injecting casting material into the dies and in contact with a plurality of spaced side surfaces of the first member. The dies are then separated to free the interlinked members.

Having fully described my invention, what I claim as new and desire to secure by Letters Patent is:

1. The method of producing loosely intercoupled ring-like products that are freely movable in all directions relatively to one another, which comprises forming, at one casting station and in the absence of a separate core member for forming an opening in said products, one ring-like product with offset portions having a plurality of spaced surfaces arranged in common alinement, then positioning the cast product at a second casting station, said surfaces defining part of the mold cavity of said second station, then forming, at the second station, a second product looped within the first product and partially formed on said alined surfaces of the first product.

2. The method of producing loosely intercoupled ring-like products that are freely movable in all directions relatively to one another, which comprises forming, at one casting station and in the absence of a separate core member for forming an opening in said products, one ring-like product with offset portions having a plurality of spaced surfaces arranged in common alinement, then positioning the cast product at a second casting station, said surfaces defining part of the mold cavity of said second station, then forming, at the second station, a second product looped within the first product and partially formed on said alined surfaces of the first product, and simultaneously with the second product forming another ring-like product at the first station.

3. A method of casting a chain of loosely interconnected links that are freely movable in all directions relatively to one another comprising forming a first link in one casting step by pressure injecting casting material into the mating cavities of a pair of relatively movable coreless dies, said link having upper and lower parts each of which is offset with respect to a plane passing through the parting line of said dies, one of said parts being offset oppositely to the other of said parts, said parts being connected to each other by a pair of arms each of which are offset with respect to said plane, one of said arms being offset oppositely to the other, forming simultaneously with said link in said casting step a ring member about a movable transfer rod disposed on one side of said mating cavities, said ring member being connected to the link, separating the dies to free the link and ring member, moving the link relatively to said dies by moving said transfer rod, closing the dies so that a portion of said link is enclosed within said mating cavities, forming a second link interconnected with the first link by pressure injecting casting material into said mating cavities and in contact with a plurality of spaced side surfaces of the first link, separating the dies, continuing to form each succeeding link interconnected with a preceding link in the manner described, thereby producing loosely interconnected, relatively movable links.

4. A method of casting, loosely interlinked members that are freely movable in all directions relatively to one another comprising forming a first member in one casting step by pressure injecting casting material into a pair of relatively movable coreless dies, said member having a pair of oppositely disposed parts which are offset with respect to a plane passing through the parting line of said dies, separating the dies to free said member, moving the member relatively to said dies, closing the dies about at least a portion of said member, forming a succeeding member interlinked with the first member by pressure injecting casting material into said dies and in contact with a plurality of spaced side surfaces of the first member, and separating the dies to free said interlinked members.

5. In the method of forming a chain of loosely interconnected pinless links by successively die casting them in a pair of relatively movable dies and wherein said links are freely movable in all directions relatively to one another, each link being identical and comprising a continuous bar in the form of a closed loop the opening of which is relatively large, the improvement comprising forming a first link by pressure injecting casting material to the cavity of said dies in the absence of a separate core member for forming said link opening, said link having two pairs of oppositely disposed bar parts, each part being offset with respect to a plane passing through the parting line of said dies and the parts of each pair being offset oppositely to each other, separating the dies and moving the link partially out of the cavity, closing the dies about a portion of said link including one of said bar parts so that a plurality of spaced oppositely disposed surfaces of said link portion form a part of the cavity, pressure injecting casting material to said cavity and in contact with said plurality of spaced surfaces of the first link to form a second link around said last-mentioned bar part and interlinked with the first link, separating the dies, and continuing to form succeeding links each interlinked with a preceding link in the manner described.

6. In the method of forming a chain of loosely interconnected links by successively die casting them and wherein said links are freely movable in all directions relatively to one another, each link comprising a continuous bar in the form of a closed loop the opening of which is relatively large, the improvement comprising forming a first link by pressure injecting casting material to the cavity of a pair of relatively movable coreless dies, said link having two pairs of oppositely disposed bar parts, each part being offset with respect to a plane passing through the parting line of said dies and the parts of each pair being offset oppositely to each other, separating the dies and moving the link partially out of the cavity, closing the dies about a portion of said link including one of said bar parts so that a plurality of spaced surfaces of said link portion form a part of the cavity, and pressure injecting casting material to said cavity and in contact with said plurality of spaced surfaces of the first link to form a second link interlinked with the first link.

7. In the method of forming loosely interconnected members by successively die casting them and wherein said members are freely movable in all directions relatively to one another, each member comprising a continuous bar in the form of a closed loop, the improvement comprising forming a first member by pressure injecting casting material to the cavity of a pair of relatively movable coreless dies, said member having oppositely disposed bar parts offset with respect to a plane passing through the parting line of said dies, separating the dies and moving the member relatively thereto, closing the dies about at least a portion of the member so that a plurality of spaced surfaces of the member form die cavity surfaces, and pressure injecting casting material to said dies and in contact with said plurality of spaced surfaces of the first member to form a second member interlinked with the first member.

8. In the method of forming loosely interconnected members by successively die casting them and wherein said members are freely movable in all directions relatively to one another, each member comprising a continuous bar in the form of a closed loop, the improvement comprising forming a first member by pressure injecting casting material to the cavity of a pair of relatively movable coreless dies, coincidently forming around a transfer rod adjacent said cavity a split ring connected to said member, said member having oppositely disposed bar parts offset with respect to a plane passing through the parting line of said dies, separating the dies and moving the member relatively thereto by moving said rod, closing the dies about at least a portion of the member so that a plurality of spaced surfaces of the member form die cavity surfaces, stripping the rod from the split ring and moving said rod to its original position, and pressure injecting casting material to said dies and in contact with said plurality of spaced surfaces of the first member to form a second member interlinked with the first member.

9. In a continuous method of producing a chain of loosely inter-connected pinless links by successively die casting each link in interlinked relation with a preceding link, said links being freely movable in all directions relatively to one another, each link being identical and comprising a continuous bar in the form of a closed loop the opening of which is relatively large, the improvement comprising forming a first link by pressure injecting casting material to the mating cavities of a pair of relatively movable coreless dies; said link having two pairs of oppositely disposed bar parts, each part being intersected by a plane passing through the parting plane of said dies, forming each part offset relatively to said plane so that one end portion of said part is disposed on one side of the plane and the other end portion is disposed on the opposite side of the plane, each part being offset oppositely to an oppositely disposed part; each pair of next adjacent parts being joined to form a corner, forming one pair of opposed corners in the cavity of one die and the other pair of opposed corners in the cavity of the other die so that said one pair is disposed on one side of said plane and the other pair on the opposite side; separating the dies, moving the link partially out of said dies while maintaining it substantially in said plane; closing the dies about a portion of said link to include therebetween one of said bar parts and a pair of next adjacent corners so that a plurality of spaced, oppositely disposed surfaces of said link form a part of said cavities, said bar parts of said link being intersected by said parting plane as previously described; pressure injecting casting material to said cavities and in contact with said plurality of spaced surfaces of the first link to form a second link, forming said second link with a bar part beneath and in contact with said one bar part of said first link, said bar parts in contact with each other being offset towards opposite sides of said plane so that said second link is interlinked with the first link; separating the dies, moving said links therefrom, continuing to form succeeding links each interlinked with a preceding link in the manner described; and subjecting each next adjacent pair of links to a slight stress to render the links freely movable one relatively to the other.

10. In a continuous method of forming a chain of loosely inter-connected links by successively die casting each link in interlinked relation with a preceding link, said links being freely movable in all directions relatively to one another, each link comprising a continuous bar in the form of a closed loop, the improvement comprising forming a first link by pressure injecting casting material to the mating cavities of a pair of relatively movable coreless dies, said link having oppositely disposed bar parts connected by spaced arms, each part being intersected by a plane passing through the parting plane of said dies, forming each part offset relatively to said plane so that one end portion of said part and a portion of the arm connected thereto are disposed on one side of said plane and the other end portion and a portion of the arm connected thereto are disposed on the opposite side of said plane, each part also being offset oppositely to an oppositely disposed part, separating the dies, moving the link substantially in said plane and partially out of said cavities, closing the dies about a portion of said link to include therebetween one of said bar parts and portions of the arms connected thereto so that a plurality of spaced, oppositely disposed surfaces of said link form a part of said cavities, said bar parts of said link being intersected by said parting plane as previously described, pressure injecting casting material to said cavities and in contact with said plurality of spaced surfaces of the first link to form a second link, forming said link with a bar part intermediate the bar parts of the first link and adjacent said one bar part and with connecting arms in contact with the arm portions of said one bar part, said adjacent bar parts and the arm portions thereof being offset towards opposite sides of said plane so that said second link is interlinked with the first link, separating the dies, moving said links therefrom, and continuing to form succeeding links each interlinked with a preceding link in the manner described.

11. In a continuous method of producing an article comprising loosely interconnected members by successively die casting each member, said members being freely movable in all directions relatively to one another, each member substantially comprising a continuous bar in the form of a closed loop, the improvement comprising forming a first member by pressure injecting casting material to a pair of relatively movable coreless dies; said member being intersected by a plane passing through the parting plane of said dies, said member comprising a part having a pair of spaced, oppositely disposed arms connected thereto, forming said part and arms offset relatively to said plane so that one portion of said part and one arm are disposed on one side of said plane and the other portion of said part and the other arm are disposed on the opposite side of said plane; separating the dies, moving the member relatively thereto while maintaining it substantially in said plane; closing the dies about at least a portion of said member to include therebetween said part and portions of said arms so that a plurality of spaced, oppositely disposed surfaces of said member are in die casting position, said member being intersected by said parting plane as previously described; pressure injecting casting material to said dies and in contact with said plurality of spaced surfaces of the first member to form a second member comprising a part having spaced, oppositely disposed arms connected thereto, forming said second member with the part thereof disposed through the loop of said first member and with the arms thereof in contact with said portions of arms of the first member, said parts and the respective arms thereof being offset towards opposite sides of said plane so that said second member is interlinked with the first member; separating the dies, moving said members therefrom, and subjecting said members to a slight stress to render the members freely movable one relatively to the other.

12. In a method of producing an article comprising loosely interconnected members by successively die casting each member, said members being freely movable in all directions relatively to one another, each member substantially comprising a continuous bar in the form of a closed loop, the improvement comprising forming a first member by pressure injecting casting material to the mating cavities of a pair of relatively movable coreless dies; said member being intersected by a plane passing through the parting plane of said dies, said member comprising a part having a pair of spaced, oppositely disposed arms connected thereto, forming said part and arms offset relatively to said plane so that one portion of said part and one arm are disposed on one side of said plane and the other portion of said part and the other arm are disposed on the opposite side of said plane; separating the dies, moving the member relatively thereto while maintaining it substantially in said plane; closing the dies about at least a portion of said member to include, in another pair of mating cavities in said dies, said part and portions of said arms so that a plurality of spaced, oppositely disposed surfaces of said member form a part of said last-mentioned cavities, said member being intersected by said parting plane as previously described; pressure injecting casting material to said last-mentioned cavities to form a second member having a part disposed through the loop of said first member and having arms in contact with said portions of arms of the first member, said parts and the respective arms thereof being offset towards opposite sides of said plane so that said second member is interlinked with the first member; separating the dies, and moving said members therefrom.

References Cited in the file of this patent
UNITED STATES PATENTS

| Number | Name | Date |
|---|---|---|
| 878,989 | Newhall | Feb. 11, 1908 |
| 895,883 | McIntire | Aug. 11, 1908 |
| 1,341,052 | Gale | May 25, 1920 |
| 2,051,653 | Rich | Aug. 18, 1936 |
| 2,069,980 | Stahl | Feb. 9, 1937 |
| 2,260,630 | McKinnon et al. | Oct. 28, 1941 |
| 2,261,627 | Laystrom | Nov. 4, 1941 |
| 2,388,986 | Morin | Nov. 13, 1945 |
| 2,460,524 | Morin | Feb. 1, 1949 |
| 2,498,031 | Deiss | Feb. 21, 1950 |
| 2,577,350 | Morin | Dec. 4, 1951 |
| 2,607,957 | Danielson | Aug. 26, 1952 |
| 2,609,570 | Danielson | Sept. 9, 1952 |